(12) United States Patent
Ozawa

(10) Patent No.: US 9,378,078 B2
(45) Date of Patent: Jun. 28, 2016

(54) CONTROLLING METHOD, INFORMATION PROCESSING APPARATUS, STORAGE MEDIUM, AND METHOD OF DETECTING FAILURE

(71) Applicant: FUJITSU LIMITED, Kawasaki-shi, Kanagawa (JP)

(72) Inventor: Toshihiro Ozawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 203 days.

(21) Appl. No.: 14/199,466

(22) Filed: Mar. 6, 2014

(65) Prior Publication Data

US 2014/0289562 A1     Sep. 25, 2014

(30) Foreign Application Priority Data

Mar. 21, 2013 (JP) ................................. 2013-059039

(51) Int. Cl.
*G06F 11/00* (2006.01)
*G06F 11/07* (2006.01)

(52) U.S. Cl.
CPC ........ *G06F 11/0751* (2013.01); *G06F 11/0727* (2013.01)

(58) Field of Classification Search
CPC ............. G06F 11/0727; G06F 11/0751; G06F 11/0757; G06F 11/1088; G06F 11/14; G06F 11/2053; G06F 11/2056; G06F 11/2058; G06F 11/2094
See application file for complete search history.

(56) References Cited

U.S. PATENT DOCUMENTS 9,183,096 B2 * 11/2015 Bryant ................ G06F 11/1464
2011/0178985 A1    7/2011 San Martin et al.
2014/0032496 A1 *  1/2014 Urano ................. G06F 11/2053
                                                           707/634

FOREIGN PATENT DOCUMENTS

JP          2012-504807           2/2012

* cited by examiner

*Primary Examiner* — Joshua P Lottich
(74) *Attorney, Agent, or Firm* — Staas & Halsey LLP

(57) ABSTRACT

A controlling method executed by a processor included in an information processing apparatus, the controlling method includes storing identifiers of information processing apparatuses and identifiers of groups, each of the information processing apparatuses belonging to at least one of the groups, a group among the groups storing replications of one or more identifiable data; and detecting, by the information processing apparatus, a failure of other information processing apparatus belonging to one or more groups among the groups to which the information processing apparatus executing the detecting of the failure belongs, based on the identifiers of information apparatuses and the identifiers of groups.

14 Claims, 19 Drawing Sheets

FIG. 3

| HASH RANGE | 1st | 2nd | 3rd |
|---|---|---|---|
| 000~aaa | A | B | C |
| aaa~bbb | B | C | D |
| bbb~ccc | E | F | G |
| ccc~dd | F | G | H |

| REPLICA SHARING NODE GROUP | NODE |
|---|---|
| 1 | A,B,C,D |
| 2 | E,F,G,H |

| SERVER | ACCESS COUNT | 17 |
|---|---|---|
| A | 30 | |
| B | 20 | |
| C | 10 | |

CONTROLLING METHOD, INFORMATION PROCESSING APPARATUS, STORAGE MEDIUM, AND METHOD OF DETECTING FAILURE

CROSS-REFERENCE TO RELATED APPLICATION

This application is based upon and claims the benefit of priority of the prior Japanese Patent Application No. 2013-059039, filed on Mar. 21, 2013, the entire contents of which are incorporated herein by reference.

FIELD

The embodiment discussed herein is related to a controlling method, an information processing system, a storage medium storing a program for controlling an information processing apparatus, and method of detecting failure in node devices of a distributed storage system.

BACKGROUND

In general, in an information processing system in which data is stored in a plurality of nodes in a multiplexed manner, such as NoSQL® which is typified by distributed key value store (KVS), alive monitoring is performed on all the nodes by each of the nodes.

Here, the term "node" represents an information processing apparatus including a central processing unit (CPU), a main memory, and a disk device. The nodes are connected to one another through a network. The term "alive monitoring" represents that each of the nodes performs monitoring to determine whether the other nodes perform normal operation. An information processing system functions as a distributed storage system. In the information processing system, the individual nodes function as storage devices which store data in a distributed manner.

A technique is disclosed in which, in a distributed database system including a plurality of nodes which individually store replicas, a master node receives alive messages from the other nodes for alive monitoring (refer to Japanese National Publication of International Patent Application No. 2012-504807, for example). The term "replica" represents a copy of data.

However, there arises a problem in that, when the master node or each of the nodes performs the alive monitoring on all the other nodes, overhead of the alive monitoring becomes large. For example, each of nodes which do not share replicas is not desired to perform a recovery process on the other nodes even when a failure of one of the other nodes is detected. Accordingly, alive monitoring performed between the nodes which do not share replicas is unproductive.

An object of one aspect of the present technique is to reduce overhead of alive monitoring.

SUMMARY

According to an aspect of the invention, a controlling method executed by a processor included in an information processing apparatus, the controlling method includes storing identifiers of information processing apparatuses and identifiers of groups, each of the information processing apparatuses belonging to at least one of the groups, a group among the groups storing replications of one or more identifiable data; and detecting, by the information processing apparatus, a failure of other information processing apparatus belonging to one or more groups among the groups to which the information processing apparatus executing the detecting of the failure belongs, based on the identifiers of information apparatuses and the identifiers of groups.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an exemplary data distribution table;

FIG. 4 is a diagram illustrating an exemplary group table;

FIG. 7 is a diagram illustrating an exemplary access table;

DESCRIPTION OF EMBODIMENT

Hereinafter, an embodiment of an information processing system, a storage medium storing a program for controlling an information processing apparatus, and a method for controlling the information processing system will be described with reference to the accompanying drawings. The disclosed technique is not limited to this embodiment.

Figure 1:
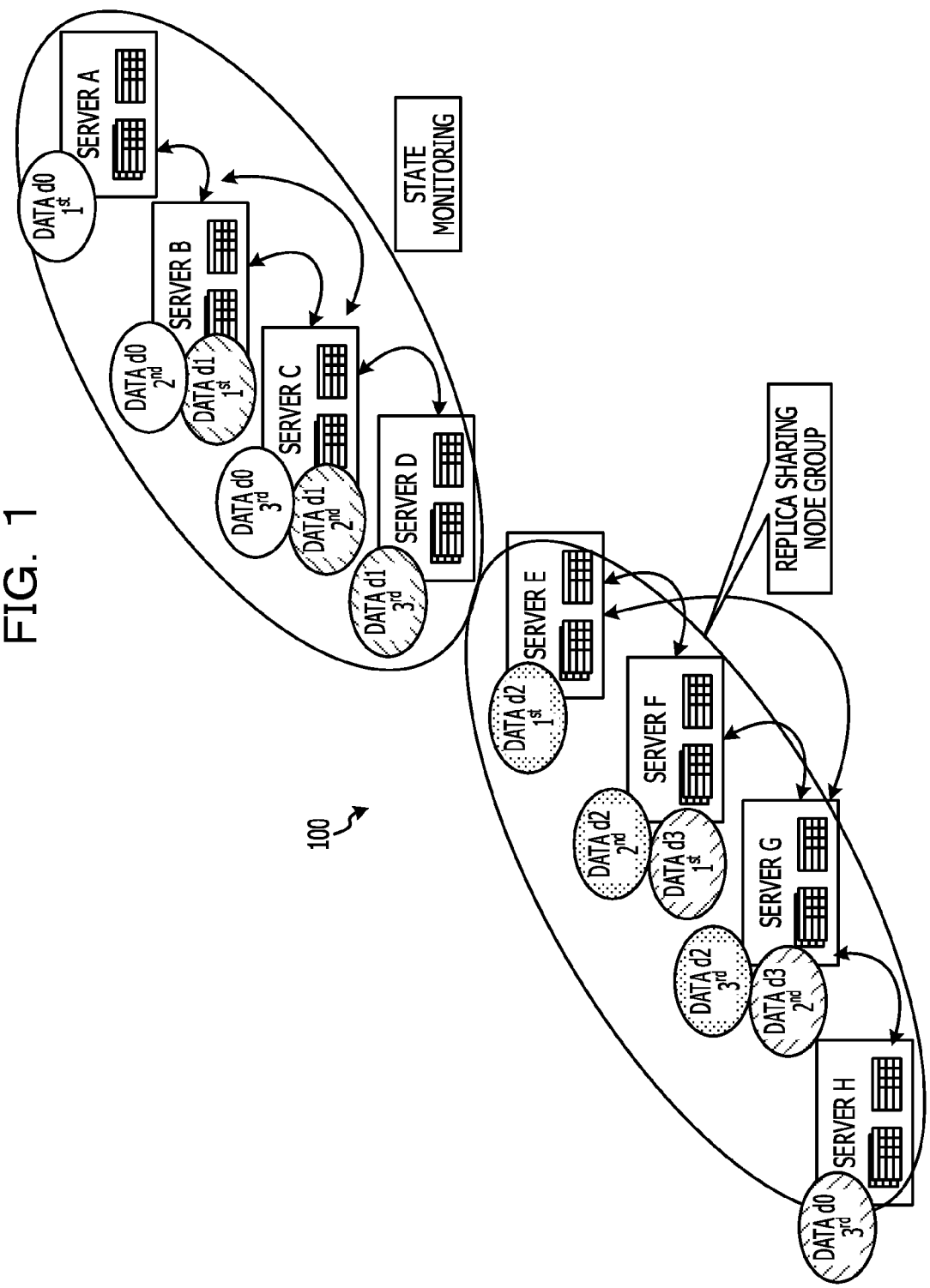
FIG. 1 is a diagram illustrating alive monitoring performed by an information processing system according to an embodiment.

First, alive monitoring performed by an information processing system according to an embodiment will be described. FIG. 1 is a diagram illustrating alive monitoring performed by an information processing system according to the embodiment. As illustrated in FIG. 1, an information processing system 100 includes servers A to H operating as nodes.

The server A has a first replica (1st replica) of data d0. The server B has a second replica (2nd replica) of the data d0 and a first replica of data d1. The server C has a third replica (3rd replica) of the data d0 and a second replica of the data d1. The server D has a third replica of the data d1.

The server E has a first replica of data d2. The server F has a second replica of the data d2 and a first replica of data d3. The server G has a third replica of the data d2 and a second replica of the data d3. The server H has a third replica of the data d3.

The information processing system 100 is divided into two replica sharing node groups. Here, a replica sharing node group represents the union of sets of nodes individually having a replica. The sets include a common node.

For example, a set X of the nodes having the replicas of the data d0 is constituted by the servers A to C, and a set Y of the nodes having the replicas of the data d1 is constituted by the servers B to D. Since the two sets X and Y have the servers B and C in common, the union of the sets X and Y corresponds to a first replica sharing node group including the servers A to D.

Similarly, a set Z of the nodes having the replicas of the data d2 is constituted by the servers E to G, and a set W of the nodes having the replicas of the data d3 is constituted by the servers F to H. Since the two sets Z and W have the servers F and G in common and the union of the sets Z and W corresponds to a second replica sharing node group including the servers E to H.

The information processing system 100 performs alive monitoring within each of the replica sharing node groups. Specifically, the server A performs alive monitoring on the servers B to D, the server B performs alive monitoring on the servers A, C, and D, the server C performs alive monitoring on the servers A, B, and D, and the server D performs alive monitoring on the servers A to C.

Similarly, the server E performs alive monitoring on the servers F to H, the server F performs alive monitoring on the servers E, G, and H, the server G performs alive monitoring on the servers E, F, and H, and the server H performs alive monitoring on the servers E to G.

As described above, since the information processing system 100 categorizes the servers into the two replica sharing node groups according to the replicas owned by the servers and alive monitoring is performed for each replica sharing node group, overhead caused by the alive monitoring may be reduced.

Here, for the purpose of illustration, only the two replica sharing node groups are illustrated. However, the information processing system 100 may have any number of replica sharing node groups. Although a case where three replica data is stored in three nodes is described, data may be replicated and stored in any number of nodes in the information processing system 100. Furthermore, the numbers of replicas may be individually determined for data.

Figure 2:
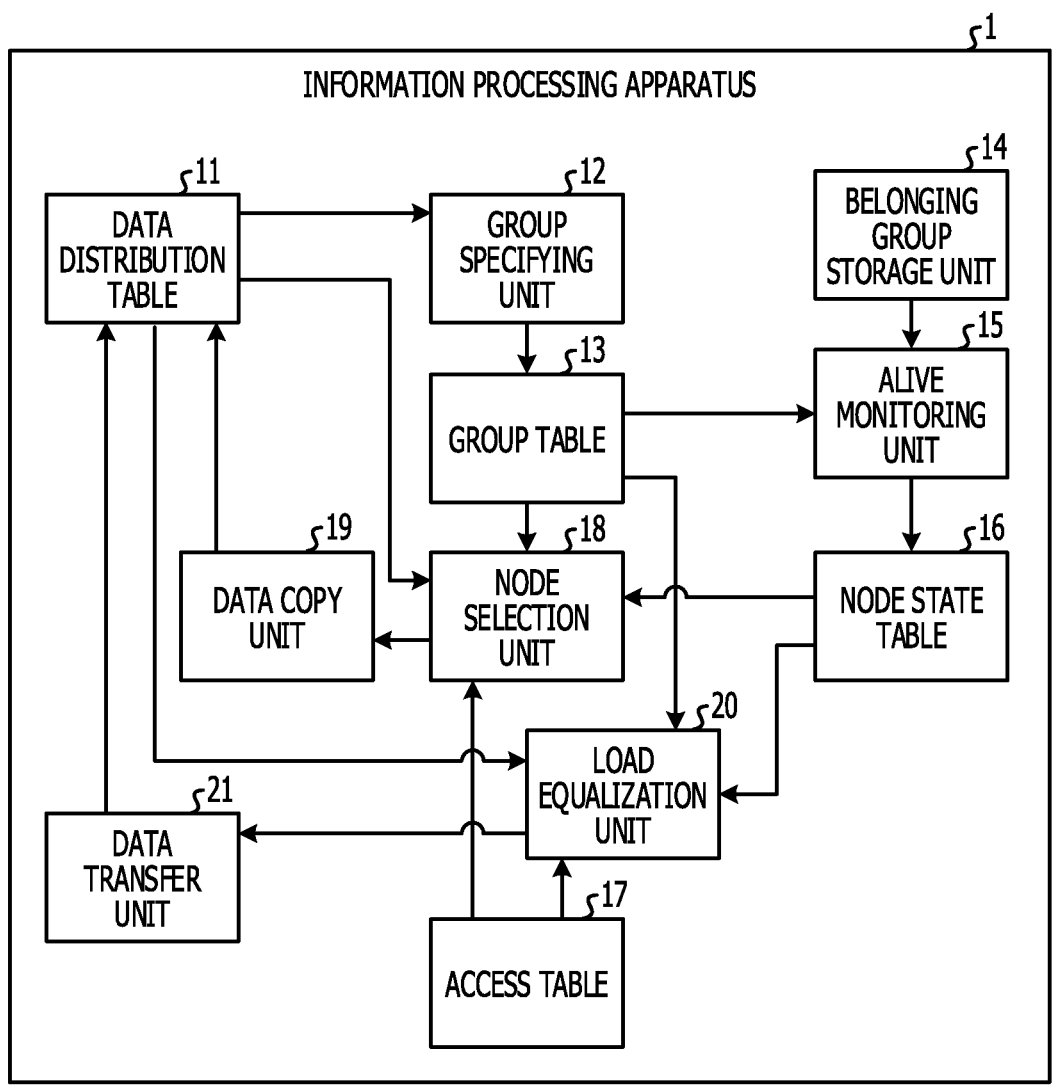
FIG. 2 is a block diagram illustrating a functional configuration of an information processing apparatus according to an embodiment.

Next, a functional configuration of an information processing apparatus of an embodiment will be described. FIG. 2 is a block diagram illustrating a functional configuration of an information processing apparatus according to the embodiment. Here, the information processing apparatus corresponds to each of the servers illustrated in FIG. 1.

As illustrated in FIG. 2, an information processing apparatus 1 includes a data distribution table 11, a group specifying unit 12, a group table 13, a belonging group storage unit 14, and an alive monitoring unit 15. The information processing apparatus 1 further includes a node state table 16, an access table 17, a node selection unit 18, a data copy unit 19, a load equalization unit 20, and a data transfer unit 21.

The data distribution table 11 stores identifiers of the servers which store the first to third replicas for individual hash ranges. FIG. 3 is a diagram illustrating an example of the data distribution table 11. Here, the term "hash range" represents a range of a value obtained by applying a hash function to a name of data. In FIG. 3, when a value obtained by applying a hash function to a name of data is within a range from "000" to "aaa", first to third replicas of the data are stored in the servers A to C, respectively.

The group specifying unit 12 specifies a replica sharing node group with reference to the data distribution table 11. The group specifying unit 12 causes the group table 13 to store a result of the specifying. When two sets having a common node are extracted from among sets of nodes having replicas, the group specifying unit 12 obtains the union of the two sets. The group specifying unit 12 repeatedly performs the process of uniting two sets until it is determined that sets of nodes do not have a common node. When sets of nodes do not have a common node, the group specifying unit 12 specifies the sets of nodes as replica sharing node groups.

For example, in FIG. 3, a set of the nodes A to C corresponding to the hash range of "000 to aaa" and a set of the nodes B to D corresponding to a hash range of "aaa to bbb" have the common nodes B and C. Therefore, a new set of the nodes A to D is generated. Since the set of the nodes A to D does not share any of the nodes with other node sets, the set of the nodes A to D is specified as a replica sharing node group. Similarly, a set of nodes E to H is specified as a replica sharing node group. The group specifying unit 12 is activated when the data distribution table 11 is updated and updates the group table 13.

The group table 13 stores information on nodes included in a replica sharing node group for each replica sharing node group. FIG. 4 is a diagram illustrating an example of the group table 13. As illustrated in FIG. 4, the group table 13 stores identifiers of the replica sharing node groups and the identifiers of the nodes included in the replica sharing node groups such that the identifiers of the replica sharing node groups and the identifiers of the nodes are associated with each other. For example, a replica sharing node group having an identifier of "1" includes the servers having identifiers of "A" to "D" as nodes.

Figure 5:
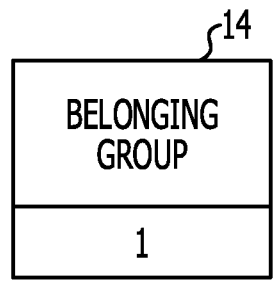
FIG. 5 is a diagram illustrating an exemplary belonging group storage unit.

The belonging group storage unit 14 stores a replica sharing node group to which the information processing apparatus 1 belongs. FIG. 5 is a diagram illustrating an example of the belonging group storage unit 14. As illustrated in FIG. 5, the belonging group storage unit 14 stores an identifier of "1" of the replica sharing node group to which the information processing apparatus 1 belongs.

The alive monitoring unit 15 performs alive monitoring between a node including the alive monitoring unit 15 and the other nodes included in a replica sharing node group to which the node including the alive monitoring unit 15 belongs with reference to the group table 13 and the belonging group storage unit 14. Then the alive monitoring unit 15 stores a result of the monitoring in the node state table 16. The alive monitoring unit 15 may reduce overhead caused by the alive monitoring by performing alive monitoring only with the other nodes included in the replica sharing node group to which the node including the alive monitoring unit 15 belongs.

Figure 6:
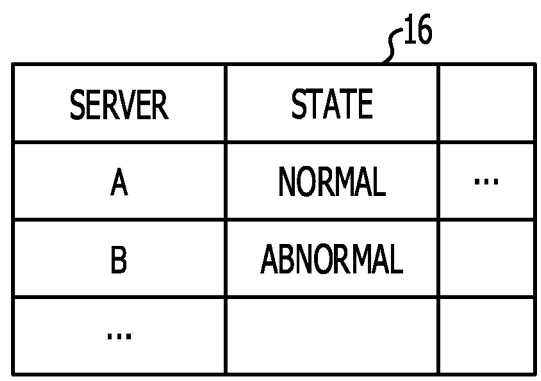
FIG. 6 is a diagram illustrating an exemplary node state table.

The node state table 16 stores information on states of the individual nodes and the like. FIG. 6 is a diagram illustrating an example of the node state table 16. As illustrated in FIG. 6, the node state table 16 stores the identifiers of the servers and states of the servers such that the identifiers and the states are associated with each other. For example, the server having the identifier of "A" is in a state of "normal".

Figure 7:
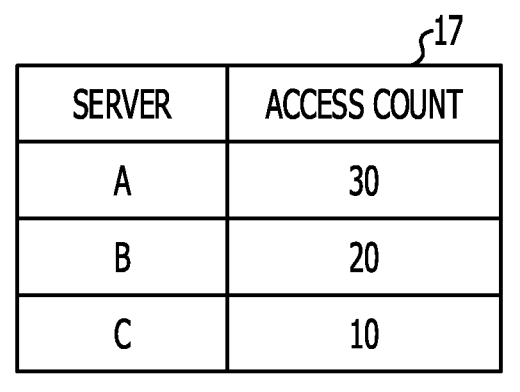

The access table 17 stores the numbers of accesses to the individual servers. The numbers of accesses are used to determine load states of the servers. FIG. 7 is a diagram illustrating an example of the access table 17. As illustrated in FIG. 7, the access table 17 stores the identifiers of the servers and the numbers of accesses to the servers such that the identifiers and the numbers of accesses are associated with each other. For example, the server having the identifier of "A" corresponds to the number of accesses of "30".

The node selection unit 18 selects, when one of the nodes included in the replica sharing node group to which the node including the node selection unit 18 belongs fails, a node which has a replica of data having the smallest ordinal number among the nodes which store the data stored in the failure node as a recovery destination, from among normal nodes. The node selection unit 18 specifies the failure node with reference to the node state table 16. Thereafter, the node selection unit 18 selects the node of the recovery destination with reference to the data distribution table 11, the group table 13, and the access table 17.

The node selection unit 18 preferentially selects one of the nodes included in the replica sharing node group to which the failure node belongs as the node of the recovery destination. The node selection unit 18 selects a node which does not have a replica of the data to be recovered and which has the lowest load as the node of the recovery destination. If a node which does not have a replica of the data to be recovered is not included in the replica sharing node group to which the failure node belongs, the node selection unit 18 selects a node which has the lowest load from a replica sharing node group including a smallest number of nodes.

The data copy unit 19 copies the replica of the data stored in the failure node in the node selected by the node selection unit 18. The data copy unit 19 updates the data distribution tables 11 of all the nodes so that the copying of the replica is reflected.

Figure 8:
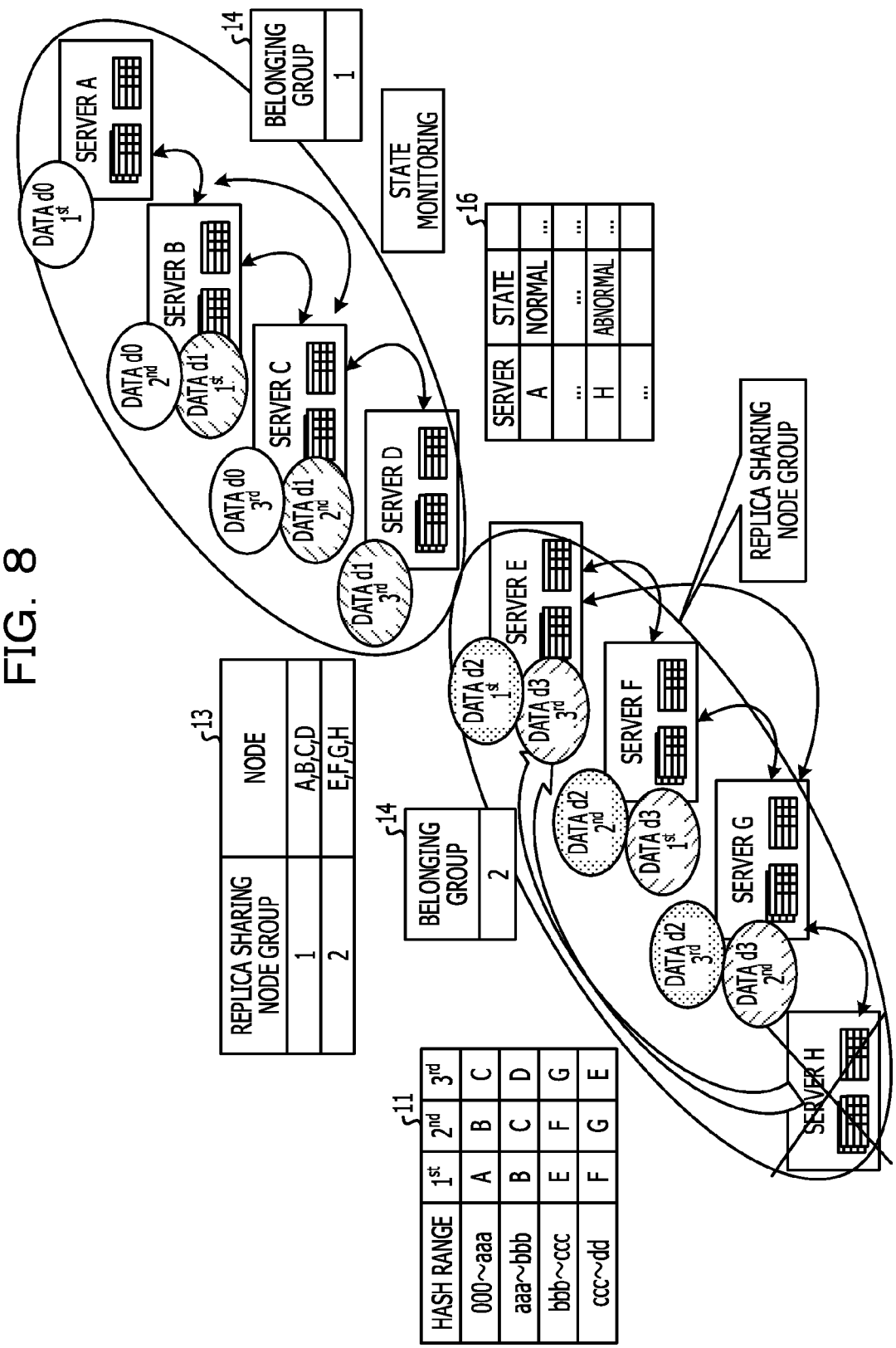
FIG. 8 is a diagram illustrating an exemplary recovery process performed when a node fails.

FIG. 8 is a diagram illustrating an exemplary recovery process performed when a node fails. In FIG. 8, a case where the server H fails is illustrated. The server H belongs to a replica sharing node group of "2", and the server F is a node which has a replica of the data d3 having the smallest ordinal number among the nodes which store the data d3 stored in the server H. Among the nodes which belong to the replica sharing node group of "2", only the server E does not store the data d3.

Therefore, the node selection unit 18 of the server F selects the server E as a node of a recovery destination of the data d3. Thereafter, the data copy unit 19 of the server F copies a replica of the data to be recovered in the server E. The data copy unit 19 of the server F updates the data distribution table 11 and determines that the server E is a node which stores the third replica of the data d3.

The load equalization unit 20 determines whether a node having a high load exists with reference to the access table 17. When it is determined that a node having a high load exists, the load equalization unit 20 selects a node of a transfer destination to which one of data stored in the node having a high load is to be transferred. The load equalization unit 20 determines that a node in which the number of accesses thereto exceeds a high load threshold value is the node having a high load and selects the node as a node of a transfer source. The load equalization unit 20 selects the node of the transfer destination with reference to the data distribution table 11, the group table 13, the node state table 16, and the access table 17.

Specifically, the load equalization unit 20 selects a node which does not have a replica of data to be transferred and which has a load equal to or lower than a low load threshold value as the node of the transfer destination of data from among nodes included in a replica sharing node group including the node of the transfer source. If the node of the transfer destination is not included in the replica sharing node group including the node of the transfer source, a node having a load equal to or lower than the low load threshold value is selected from a replica sharing node group including a smallest number of nodes. If a node having a load equal to or lower than the low load threshold value does not exist, the load equalization unit 20 does not perform the selection of the node of the transfer destination.

The data transfer unit 21 transfers single data of the node of the transfer source selected by the load equalization unit 20 to the node of the transfer destination. The data transfer unit 21 updates the data distribution tables 11 of all the nodes so that the transfer of the data is reflected.

Figure 9A:
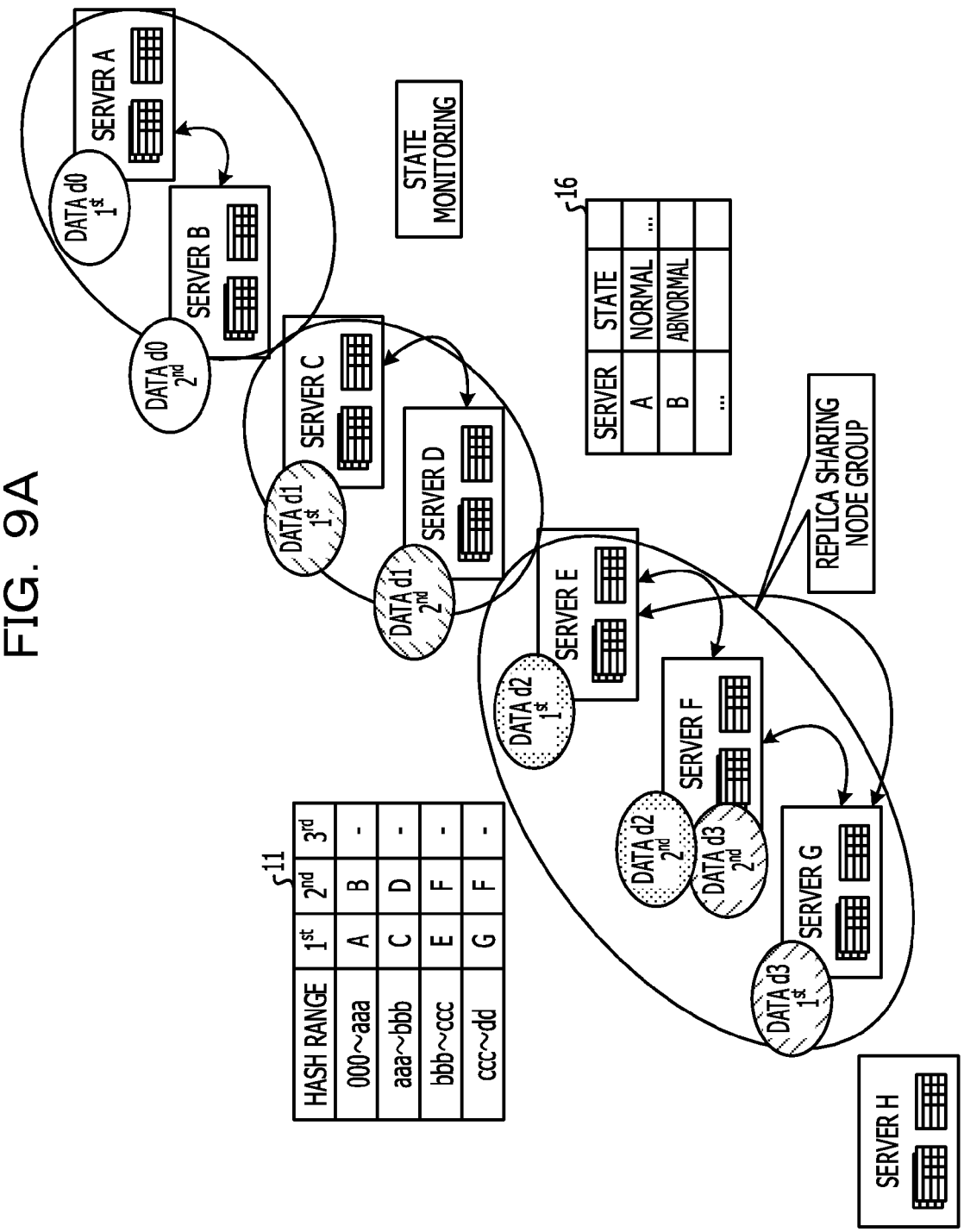
FIG. 9A is a diagram illustrating an exemplary load equalization process.
Figure 9B:
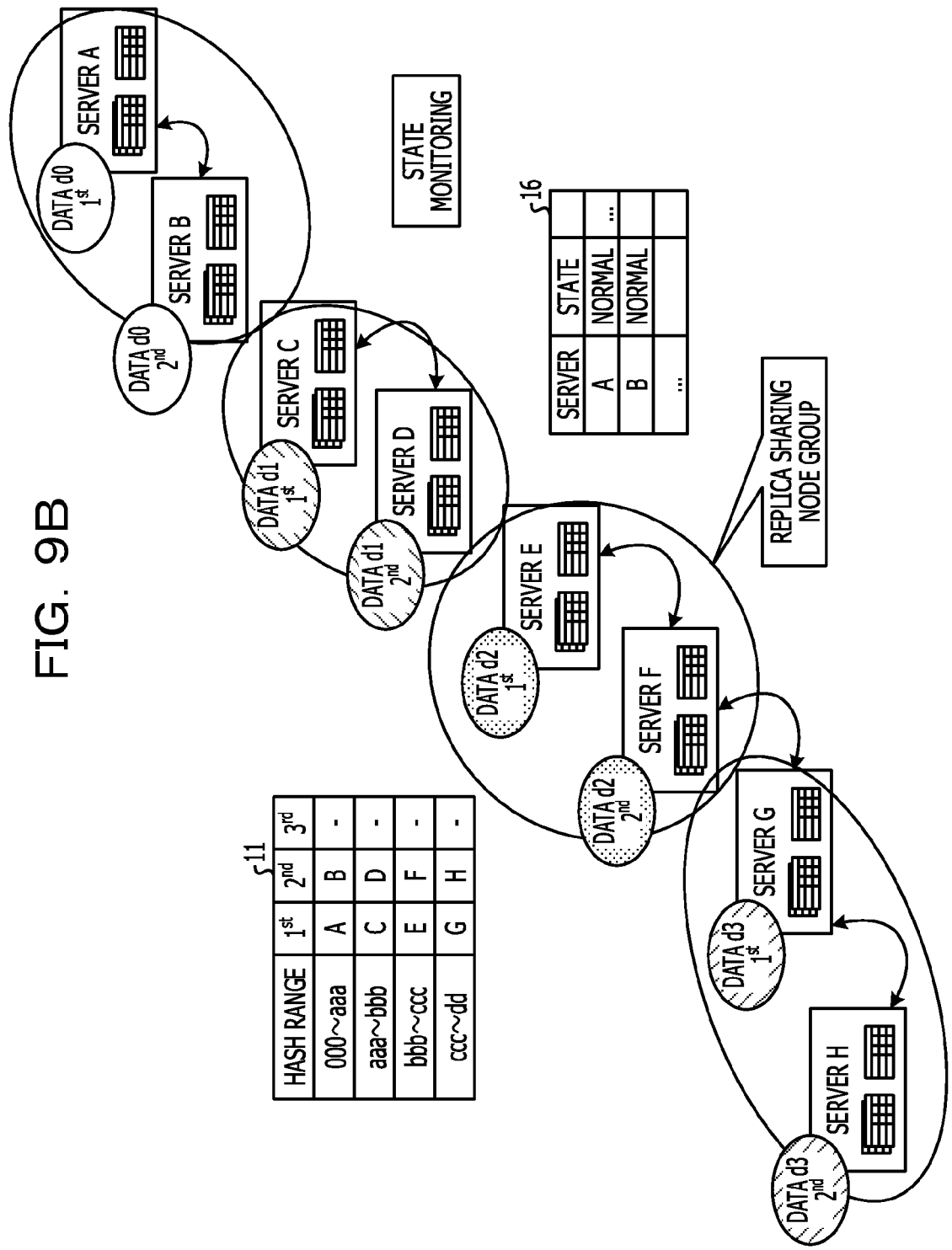
FIG. 9B is a diagram illustrating the exemplary load equalization process.

FIGS. 9A and 9B are diagrams illustrating an exemplary load equalization process. FIG. 9A is a diagram illustrating a state before the load equalization process is performed. FIG. 9B is a diagram illustrating a state after the load equalization process is performed. In FIG. 9A, the server F stores the second replica of the data d2 and the second replica of the data d3, and a load of the server F exceeds the high load threshold value. On the other hand, the server H does not store any data and a load of the server H is equal to or lower than the low load threshold value.

Therefore, the load equalization unit 20 selects the server F as the node of the transfer source and selects the server H as the node of the transfer destination. Thereafter, the data transfer unit 21 transfers the second replica of the data d3 from the server F to the server H as illustrated in FIG. 9B and updates the data distribution tables 11.

When compared with the data distribution tables 11 of FIGS. 9A and 9B, a node which stores the second replica of the data d3 in a hash range of "ccc to dd" is changed from the server F to the server H. As a result, a replica sharing node group including the servers E to G is divided into a replica sharing node group including the servers E and F and a replica sharing node group including the servers G and H.

Figure 10:
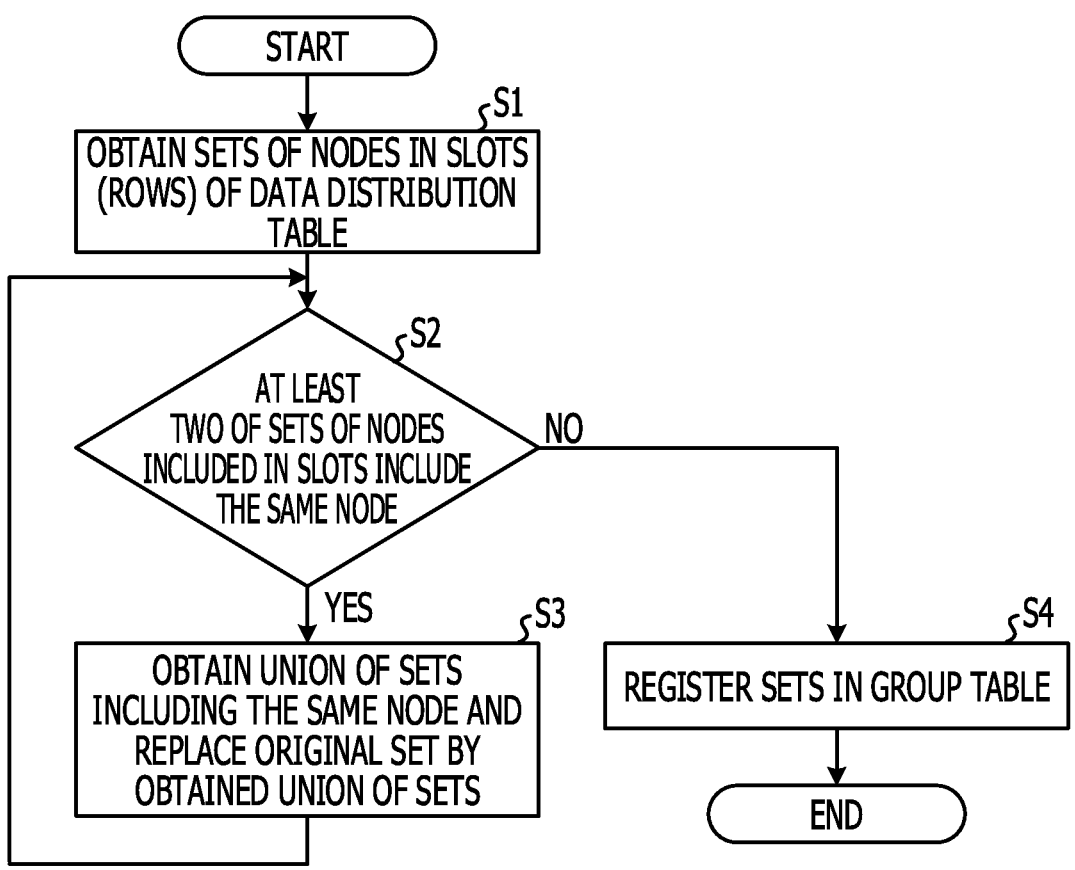
FIG. 10 is a flowchart illustrating a flow of a group specifying process performed by a group specifying unit.

Next, a flow of a group specifying process performed by the group specifying unit 12 will be described. FIG. 10 is a flowchart illustrating a flow of a group specifying process performed by the group specifying unit 12. As illustrated in FIG. 10, the group specifying unit 12 obtains sets of nodes included in individual slots in the data distribution table 11 (S1). Note that the term "slot" represents a row of the data distribution table 11.

Thereafter, the group specifying unit 12 determines whether at least two of sets of the nodes included in the slots include the same node (S2). As a result, when there are the sets, the group specifying unit 12 obtains the union of the sets including the same node and replaces an original set by the obtained union of the sets (S3). Then the process returns to step S2. On the other hand, when there are no such sets, the group specifying unit 12 registers the sets in the group table 13 (S4), and the process is terminated.

As described above, since the group specifying unit 12 generates the group table 13, the alive monitoring unit 15 may perform alive monitoring within the replica sharing node group using the group table 13.

Figure 11:
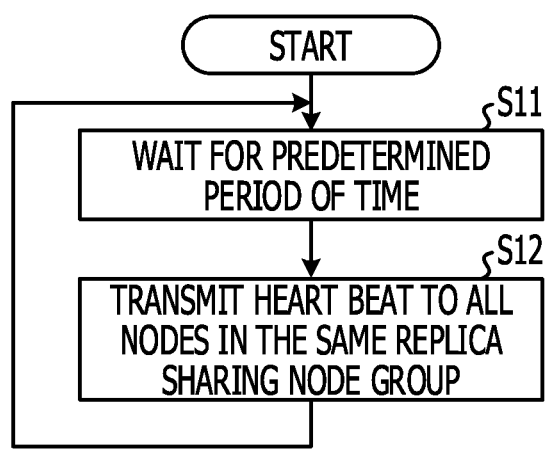
FIG. 11 is a flowchart illustrating a flow of a heart beat transmission process performed by an alive monitoring unit.
Figure 12:
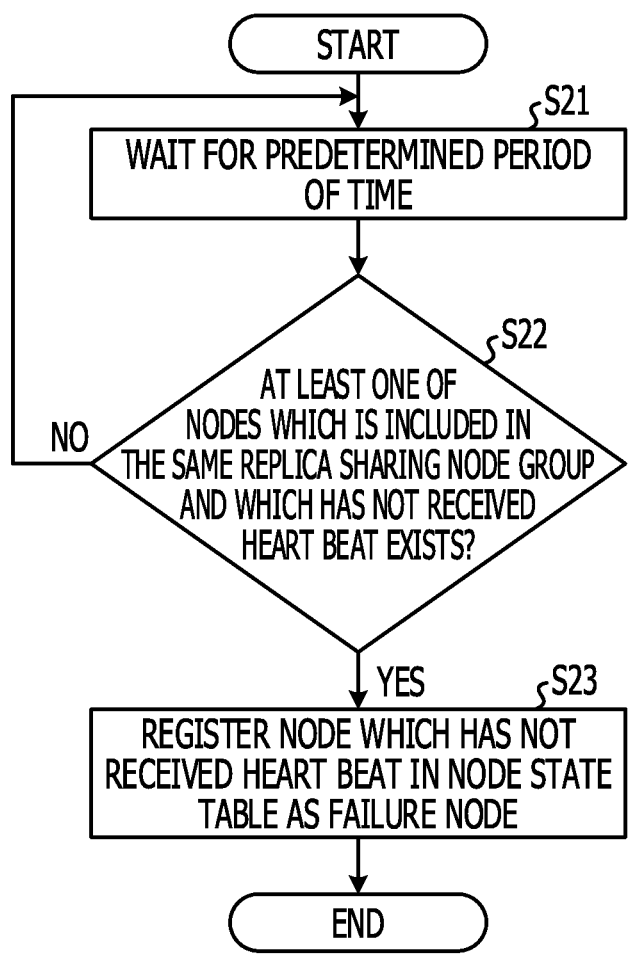
FIG. 12 is a flowchart illustrating a flow of an alive determination process performed by the alive monitoring unit.

Next, a flow of a process performed by the alive monitoring unit 15 will be described. FIG. 11 is a flowchart illustrating a flow of a heart beat transmission process performed by the alive monitoring unit 15. FIG. 12 is a flowchart illustrating a flow of an alive determination process performed by the alive monitoring unit 15. Here, the term "heart beat" represents a signal which notifies external devices of the fact that a node normally operates.

As illustrated in FIG. 11, in the heart beat transmission process, the alive monitoring unit 15 waits for a predetermined period of time (S11) and transmits a heart beat to all the nodes included in the same replica sharing node group (S12). Thereafter, the alive monitoring unit 15 returns to step S11 and the process is performed again.

In the alive determination process, as illustrated in FIG. 12, the alive monitoring unit 15 waits for a predetermined period of time (S21) and determines whether at least one of the nodes which is included in the same replica sharing node group and which has not received the heart beat exists (S22).

As a result, when all the nodes included in the same replica sharing node group have received the heart beat, the alive monitoring unit 15 returns to step S21 and the process is performed again. On the other hand, when at least one of the nodes which is included in the same replica sharing node group and which has not received the heart beat exists, the alive monitoring unit 15 registers the node which has not received the heart beat in the node state table 16 as a failure node (S23). Specifically, the alive monitoring unit 15 determines a state of the node which has not received the heart beat as "abnormal" in the node state table 16.

As described above, since the alive monitoring unit 15 performs the alive monitoring only on the nodes included in the same replica sharing node group, overhead caused by the alive monitoring may be reduced and data accessibility may be enhanced.

Figure 13:
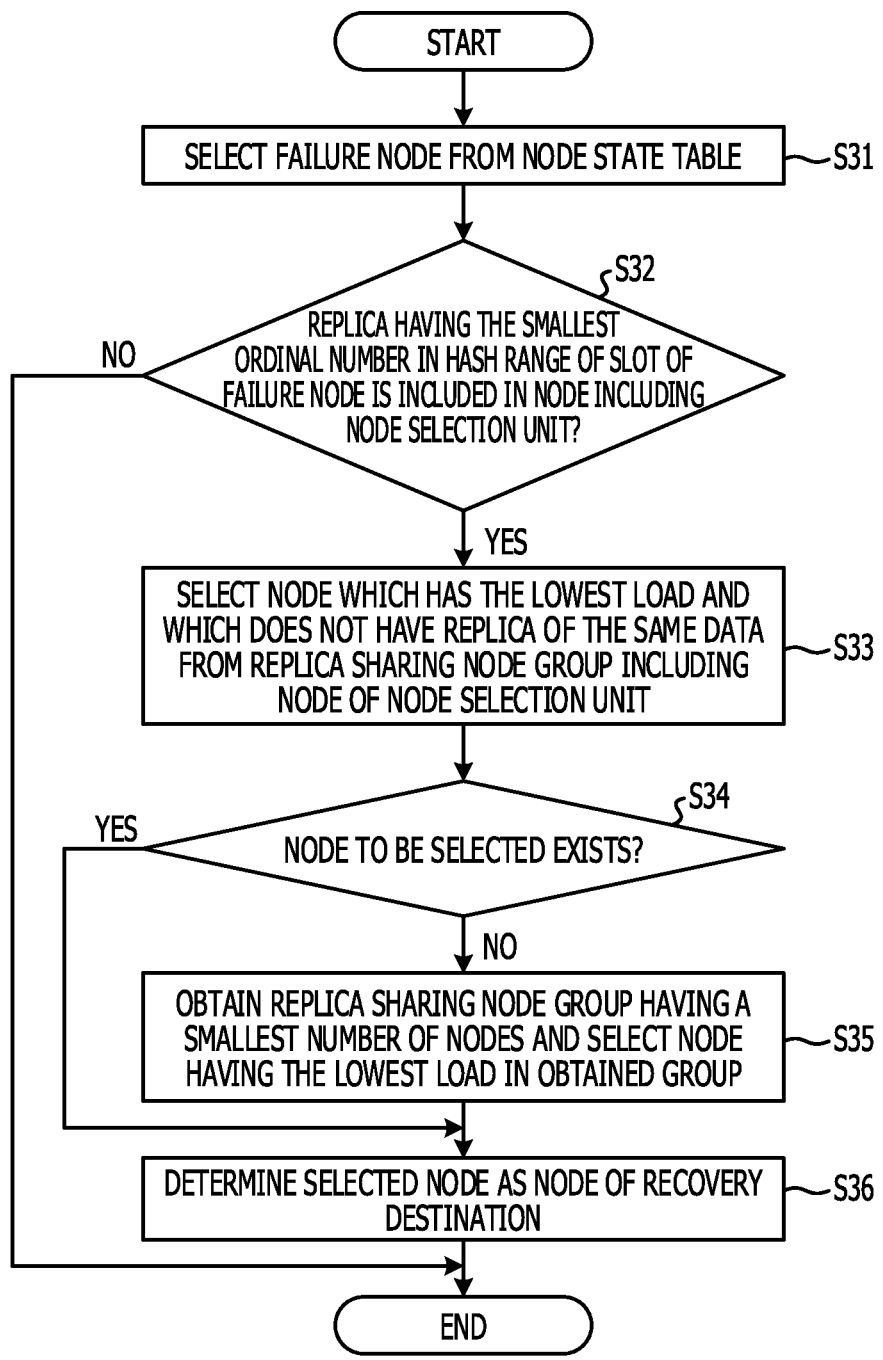
FIG. 13 is a flowchart illustrating a flow of a recovery node selection process performed by a node selection unit.

Next, a flow of a recovery node selection process performed by the node selection unit 18 will be described. FIG. 13 is a flowchart illustrating a flow of a recovery node selection process performed by the node selection unit 18. As illustrated in FIG. 13, the node selection unit 18 selects a failure node from the node state table 16 (S31).

Thereafter, the node selection unit 18 determines whether a replica having the smallest ordinal number in a hash range of a slot of the failure node is included in a node including the node selection unit 18 (S32). When the replica having the smallest ordinal number is not included in the node, the node selection unit 18 is not expected to perform recovery, and the process is terminated. Here, the slot of the failure node represents a slot in which the failure node has data.

On the other hand, when the replica having the smallest ordinal number in the hash range of a slot of the failure node is included in the node, the node selection unit 18 selects a node which has the lowest load and which does not have a replica of the same data from the replica sharing node group including the node of the node selection unit 18 (S33). Here, the node selection unit 18 refers to the access table 17 and selects a server corresponding to the smallest number of accesses as a node of the lowest load.

Thereafter, the node selection unit 18 determines whether a node to be selected exists (S34). When there is a node to be selected, the process proceeds to step S36. On the other hand, when there is not a node to be selected, the node selection unit 18 obtains a replica sharing node group having a smallest number of nodes and selects a node having the lowest load in the obtained group (S35). Then the node selection unit 18 determines the selected node as a node of a recovery destination (S36).

As described above, the node selection unit 18 preferentially selects the node of the recovery destination from the replica sharing node group including the node of the node selection unit 18 so that overhead caused by the alive monitoring increased at a time of node failure may be suppressed.

Figure 14:
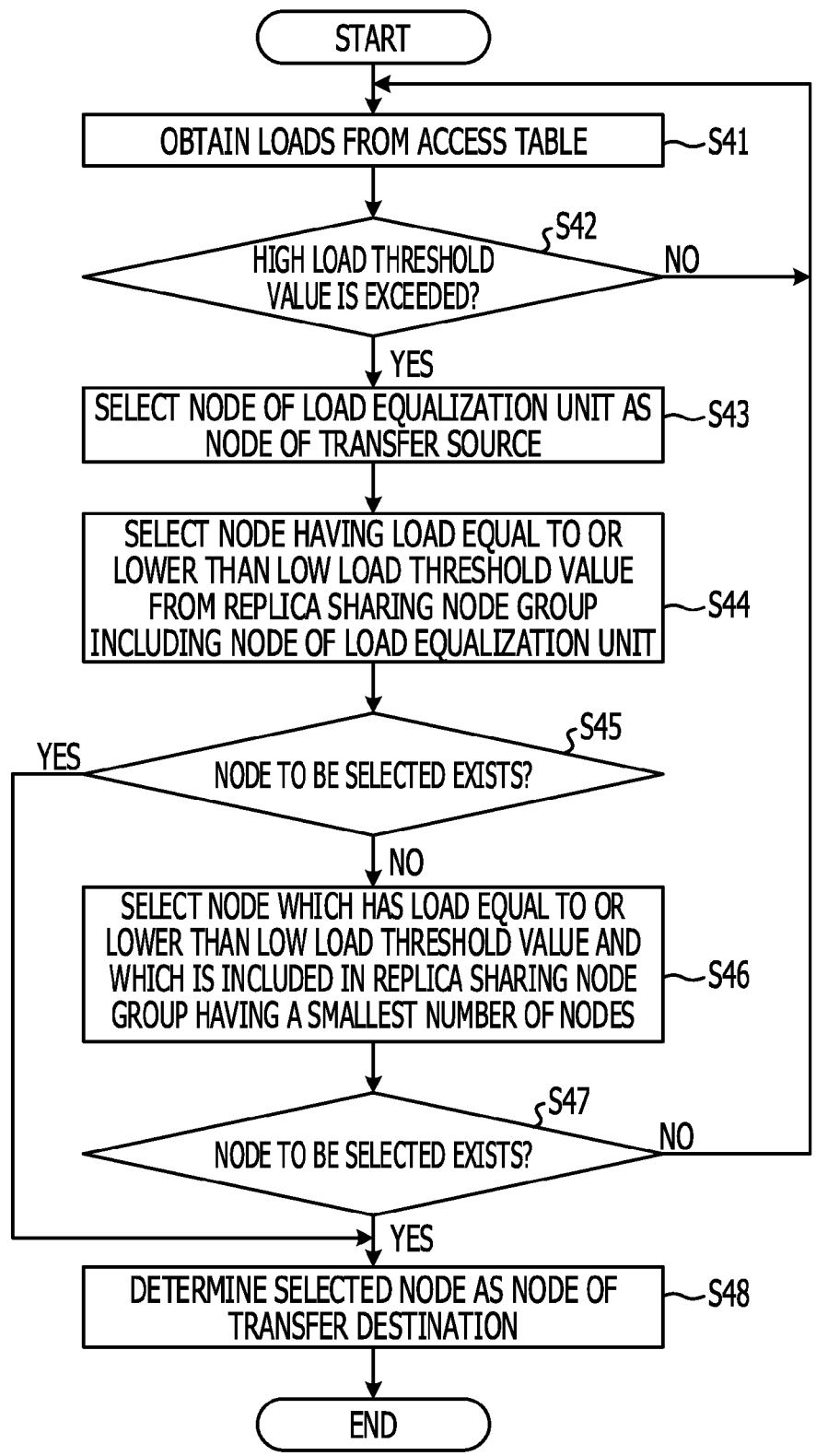
FIG. 14 is a flowchart illustrating a flow of a target selection process performed by a load equalization unit.

Next, a flow of a target selection process performed by the load equalization unit 20 will be described. FIG. 14 is a flowchart illustrating a flow of a target selection process performed by the load equalization unit 20. As illustrated in FIG. 14, the load equalization unit 20 obtains a load from the access table 17 (S41).

Subsequently, the load equalization unit 20 determines whether the obtained load exceeds the high load threshold value (S42). When the obtained load has not exceeded the high load threshold value, the process returns to step S41. On the other hand, when the obtained load has exceeded the high load threshold value, the load equalization unit 20 selects the node of the load equalization unit 20 as the node of the transfer source (S43).

Next, the load equalization unit 20 selects a node having a load equal to or lower than the low load threshold value from the replica sharing node group including the node of the load equalization unit 20 (S44) and determines whether a node to be selected exists (S45). As a result, when a node to be selected exists, the load equalization unit 20 proceeds to step S48.

On the other hand, when a node to be selected does not exist, the load equalization unit 20 selects a node which has a load equal to or lower than the low load threshold value and which is included in a replica sharing node group having a smallest number of nodes (S46) and determines whether a node to be selected exists (S47). As a result, when a node to be selected does not exist, the node of the transfer destination is not selected, and therefore, the load equalization unit 20 returns to step S41. On the other hand, when a node to be selected exists, the load equalization unit 20 determines the selected node as the node of the transfer destination (S48).

As described above, the load equalization unit 20 preferentially selects the node of the transfer destination from the replica sharing node group including the node of the transfer source so that overhead caused by the alive monitoring increased at a time of load equalization may be suppressed.

Figure 15:
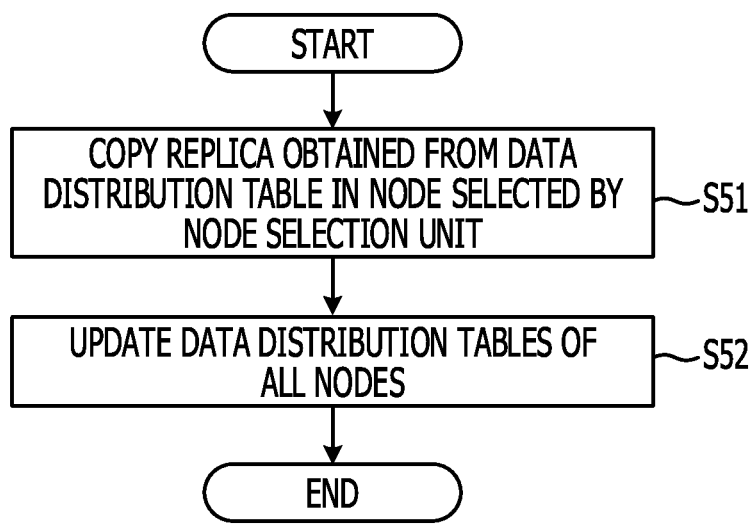
FIG. 15 is a flowchart illustrating a flow of a data copy process performed by a data copy unit.

Next, a flow of a data copy process performed by the data copy unit 19 will be described. FIG. 15 is a flowchart illustrating a flow of a data copy process performed by the data copy unit 19. As illustrated in FIG. 15, the data copy unit 19 copies a replica obtained from the data distribution table 11 in the node selected by the node selection unit 18 (S51). Thereafter, the data copy unit 19 updates the data distribution tables 11 of all the nodes (S52).

In this way, since the data copy unit 19 copies the replica obtained from the data distribution table 11 in the node selected by the node selection unit 18, the data of the failure node may be recovered.

Figure 16:
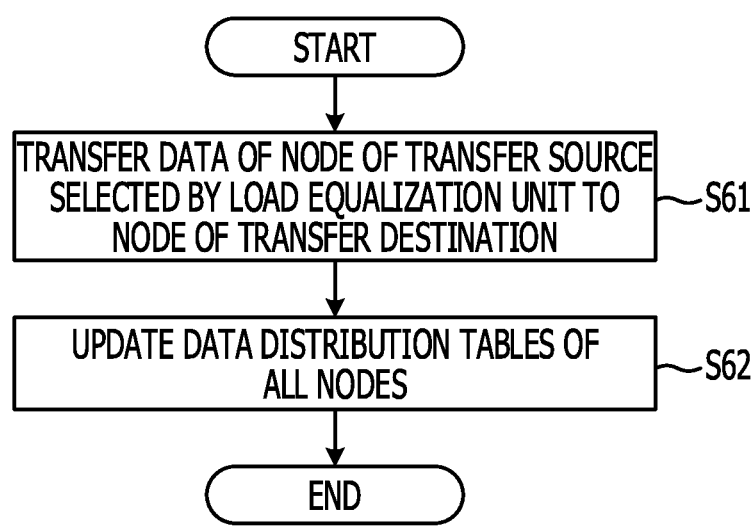
FIG. 16 is a diagram illustrating a flow of a data transfer process performed by a data transfer unit.

Next, a flow of a data transfer process performed by the data transfer unit 21 will be described. FIG. 16 is a diagram illustrating a flow of a data transfer process performed by the data transfer unit 21. As illustrated in FIG. 16, the data transfer unit 21 transfers data of the node of the transfer source selected by the load equalization unit 20 to the node of the transfer destination (S61). Thereafter, the data transfer unit 21 updates the data distribution tables 11 of all the nodes (S62).

Since the data transfer unit 21 transfers the data of the node of the transfer source selected by the load equalization unit 20 to the node of the transfer destination in this way, loads applied to the nodes may be equalized.

Figure 17:
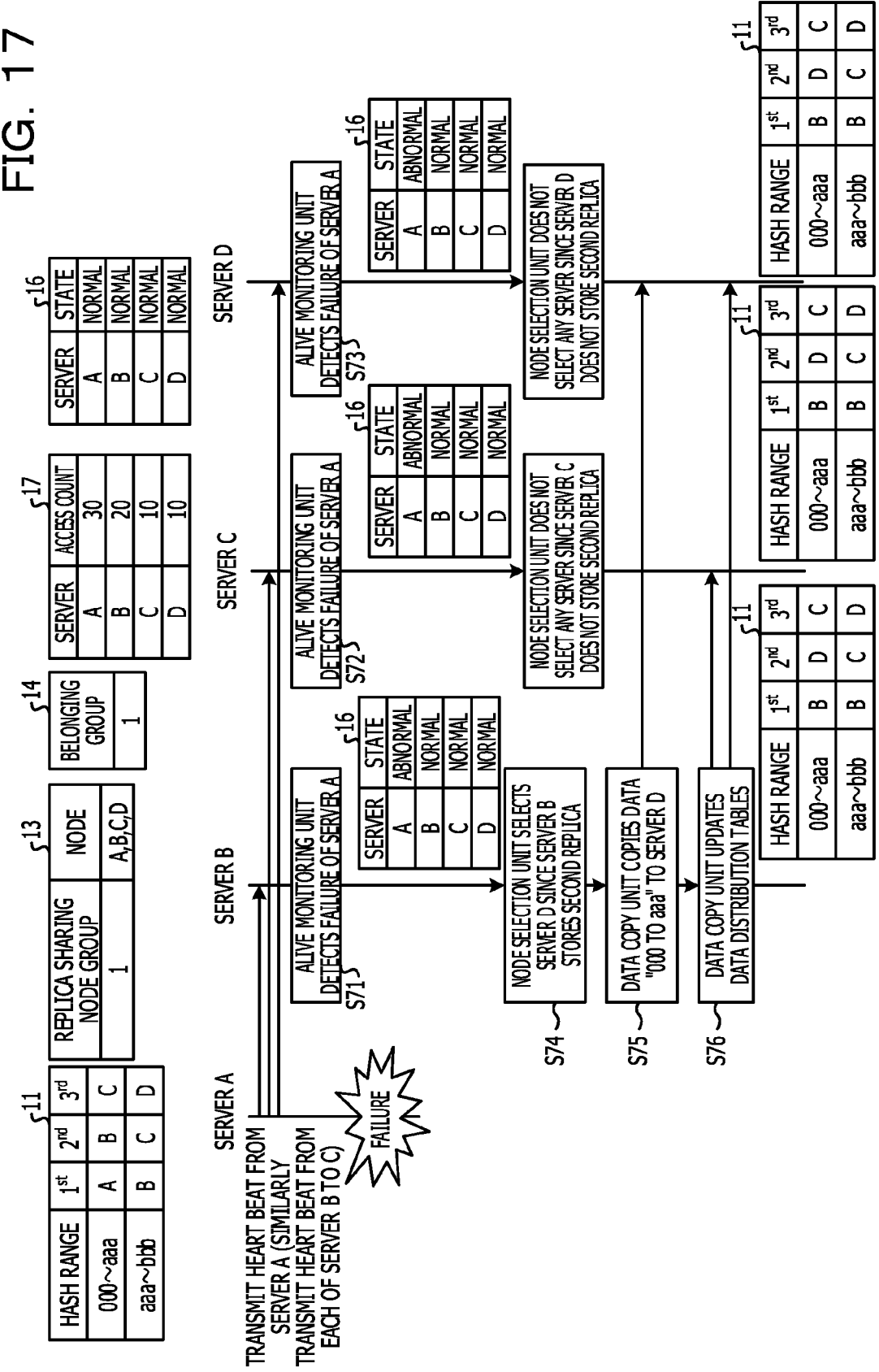
FIG. 17 is a diagram illustrating an exemplary recovery process performed by the information processing system according to an embodiment.

Next, an example of a recovery process performed by the information processing system 100 according to this embodiment will be described. FIG. 17 is a diagram illustrating a recovery process performed by the information processing system 100 according to this embodiment.

As illustrated in the data distribution table 11, as for data in a hash range of "00 to aa", the server A stores a first replica, the server B stores a second replica, and the server C stores a third replica. As for data in a hash range of "aa to bb", the server B stores a first replica, the server C stores a second replica, and the server D stores a third replica.

Accordingly, as illustrated in the group table 13, the servers A to D are included in the same replica sharing node group of "1". As illustrated in the belonging group storage unit 14, a group to which the servers A to D belong is denoted by "1".

As illustrated in the access table 17, the number of accesses to the server A is "30", the number of accesses to the server B is "20", the number of accesses to the server C is "10", and the number of accesses to the server D is "10". As illustrated in the node state table 16, states of the servers A to D are "normal".

The server A transmits a heart beat to the servers B to D. Similarly, each of the servers B to D transmits a heart beat to the other servers included in the same replica sharing node group.

In this state, when the server A fails, the alive monitoring units 15 of the servers B to D detect the failure of the server A (S71 to S73). Thereafter, the alive monitoring units 15 of the servers B to D update the corresponding node state tables 16 so that the state of the server A is changed to "abnormal".

Thereafter, since the server B stores the second replica which is the smallest ordinal number of "data 00 to aa" stored in the server A among the normal servers in the same replica sharing node group, the node selection unit 18 of the server B selects the server D as a node of a recovery destination (S74). Note that the "data 00 to aa" represents data corresponding to a hash value of "00 to aa".

Subsequently, the data copy unit 19 of the server B copies the "data 00 to aa" in the server D (S75) and updates the data distribution tables 11 of all the nodes (S76). As a result, as for the data in the hash range of "00 to aa", the server B stores the first replica, the server D stores the second replica, and the server C stores the third replica.

On the other hand, since the servers C and D do not store a replica of the smallest ordinal number of "data 00 to aa" stored in the server A among the normal servers in the same replica sharing node group, the node selection units 18 of the server C and D do not select the node of the recovery destination.

In this way, when the server A fails, the server B performs the recovery process so that the data stored in the server A is recovered in the information processing system 100.

As described above, in this embodiment, the group table 13 stores the identifiers of the servers which belong to the same replica sharing node group and the alive monitoring unit 15 performs the alive monitoring only on the servers in the same replica sharing node group with reference to the group table 13. Accordingly, the information processing system 100 may reduce overhead caused by the alive monitoring and enhance data accessibility.

In this embodiment, the data distribution table 11 stores the identifiers of the servers which store the first to third replicas for each hash range, and the group specifying unit 12 generates a replica sharing node group with reference to the data distribution table 11 and writes the replica sharing node group in the group table 13. Accordingly, the information processing apparatus 1 may automatically generate the group table 13, and therefore, a load of a system manager may be reduced.

In this embodiment, when one of the servers fails, the node selection unit 18 preferentially selects one of the servers included in the replica sharing node group including the failed server, as the server of the recovery destination. Accordingly, the information processing system 100 may suppress increase of overhead in the alive monitoring caused by the recovery process performed when one of the servers fails.

In this embodiment, when a load of one of the servers is high, the load equalization unit 20 preferentially selects one of the servers included in the replica sharing node group including the server having the high load as the server of the transfer destination. Accordingly, the information processing system 100 may suppress increase of overhead in the alive monitoring caused by the load equalization process.

The information processing apparatus is described in this embodiment. When the functional configuration of the information processing apparatus is realized by software, control programs which control the information processing apparatus and which have functions the same as those of the information processing apparatus may be obtained. Therefore, a hardware configuration of the information processing apparatus of this embodiment will be described.

Figure 18:
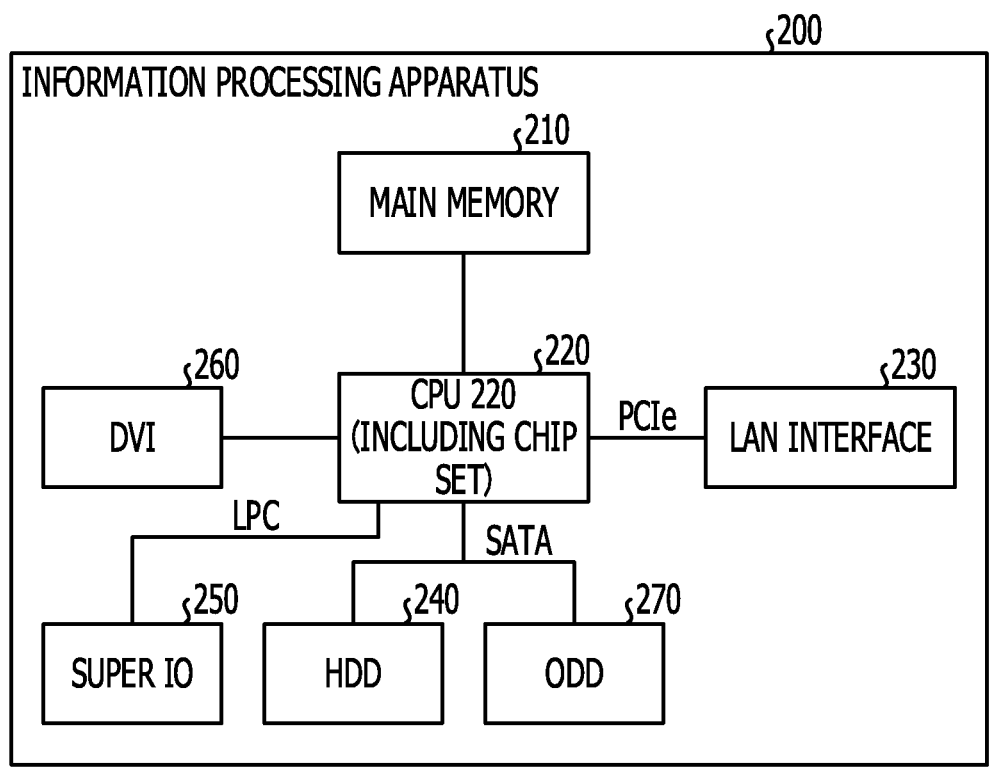
FIG. 18 is a diagram illustrating a hardware configuration of the information processing apparatus according to an embodiment.

FIG. 18 is a diagram illustrating a hardware configuration of the information processing apparatus according to this embodiment. As illustrated in FIG. 18, an information processing apparatus 200 includes a main memory 210, a CPU 220, a LAN interface 230, an HDD 240, a super IO 250, a digital visual interface (DVI) 260, and an optical disk drive (ODD) 270.

The main memory 210 stores programs and execution midstream results of the programs. The CPU 220 reads and executes the programs stored in the main memory 210. The CPU 220 includes a chip set including a memory controller.

The LAN interface 230 is used to connect the information processing apparatus 200 to another information processing apparatus through a LAN. The HDD 240 stores programs and data. The super IO 250 is an interface coupled to input devices such as a mouse and a keyboard. The DVI 260 is coupled to a liquid crystal display device. The ODD 270 performs reading and writing of a digital versatile disc (DVD).

The LAN interface 230 is coupled to the CPU 220 through a PCI express. The HDD 240 and the ODD 270 are coupled to the CPU 220 through a serial advanced technology attachment (SATA). The super IO 250 is coupled to the CPU 220 through low pin count (LPC).

The control programs to be executed by the information processing apparatus 200 are stored in the DVD. The control programs are read from the DVD by the ODD 270 and are installed in the information processing apparatus 200. Alternatively, the control programs are stored in a database of another information processing system coupled through the LAN interface 230. The control programs are read from the database and are installed in the information processing apparatus 200. The installed control programs are stored in the HDD 240, read into the main memory 210, and executed by the CPU 220.

In this embodiment, a case where the alive monitoring is performed for each replica sharing node group is described. However, the present technique is not limited to this. For example, the present technique is similarly applicable to a case where the servers are grouped according to the slots and alive monitoring is performed in each of the replica sharing node groups.

Specifically, in the example of the data distribution table 11 illustrated in FIG. 3, the servers A to H are divided into four groups, that is, a group of the servers A to C, a group of the servers B to D, a group of the servers E to G, and a group of the servers F to H. Then each of the servers performs alive monitoring within the replica sharing node group to which the server belongs. For example, the server A belongs to the only one group and performs alive monitoring on the servers B and C. On the other hand, the server B belongs to the two groups, and therefore, the server B performs alive monitoring on the server D as well as the servers A and C.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A controlling method executed by a processor included in an information processing apparatus, the controlling method comprising:
   storing identifiers of information processing apparatuses in each of a plurality of groups and identifiers of the plurality of groups,
      the information processing apparatuses respectively storing replications of one or more identifiable data,
      the plurality of groups being generated by classifying a plurality of information processing apparatuses based on types of the replications stored in each of the plurality of information processing apparatuses; and
   detecting, by the information processing apparatus, a failure of other information processing apparatus belonging to one or more groups among the plurality of groups to which the information processing apparatus executing the detecting of the failure belongs, based on the identifiers of information processing apparatuses and the identifiers of the plurality of groups.

2. The controlling method according to claim 1, wherein the plurality of groups are respectively defined by a union of sets of information processing apparatuses, the information processing apparatuses included in a set storing the replications of the one or more identifiable data, and the sets of the information processing apparatuses sharing at least one information processing apparatus.

3. The controlling method according to claim 2, further comprising:
   storing ranges of hash value obtained by applying a hash function to names identifying the replications of the one or more identifiable data and identifiers of the information processing apparatuses which store the one or more identifiable data such that the ranges of hash value and the identifiers of the information processing apparatuses are associated with each other; and
   generating the identifiers of information processing apparatuses included in the plurality of groups of information processing apparatuses in accordance with the correspondence relationships between the ranges of hash value and the identifiers of the information processing apparatuses which store the replications of the one or more identifiable data.

4. The controlling method according to claim 1, further comprising:
   selecting one of the information processing apparatuses to serve as a transfer destination of identifiable data stored in the other information processing apparatus which has failed, to be recovered from a group of information processing apparatuses to which the information processing apparatus executing the detecting of the failure belongs; and
   copying the identifiable data to be recovered to the selected information processing apparatus serving as the transfer destination.

5. The controlling method according to claim 4, wherein the selecting of the one of the information processing apparatuses includes selecting an information processing apparatus having a lowest load in the group to which the information processing apparatus executing the detecting of the failure belongs.

6. The controlling method according to claim 5, further comprising
   storing a numbers of accesses to the information processing apparatuses, and
   the selecting the information processing apparatus serving as the transfer destination of the identifiable data to be recovered includes selecting an information processing apparatus having a smallest number of accesses as the information processing apparatus having the lowest load.

7. The controlling method according to claim 1, further comprising:
   determining whether a high-load information processing apparatus which has a load higher than those of the other information processing apparatuses exists in a group to which the information processing apparatus executing the detecting of the failure belongs;
   determining identifiable data to transfer from among stored identifiable data in the high-load information processing apparatus in the group to which the information processing apparatus executing the detecting of the failure belongs and determining an information processing apparatus serving as a transfer destination; and
   transferring the data to be transferred to the information processing apparatus determined as the transfer destination.

8. The controlling method according to claim 1, wherein the detecting the failure includes transmitting a heart beat signal to the another information processing apparatuses in a group to which the information processing apparatus executing the detecting of the failure belongs.

9. An information processing apparatus, comprising:
   a memory configured to store identifiers of information processing apparatuses in each of a plurality of groups and identifiers of the plurality of groups, the information processing apparatuses respectively storing replications of one or more identifiable data, the plurality of groups being generated by classifying a plurality of information processing apparatuses based on types of the replications stored in each of the plurality of information processing apparatuses; and
   a processor coupled to the memory and configured to detect a failure of other information processing apparatus belonging to one or more groups among the plurality of groups to which the information processing apparatus executing the detecting of the failure belongs, based on the identifiers of information processing apparatuses and the identifiers of the plurality of groups.

10. The information processing apparatus according to claim 9, wherein
    the plurality of groups are respectively defined by a union of sets of information processing apparatuses, the information processing apparatuses included in a set storing the replications of the one or more identifiable data, and the sets of the information processing apparatuses sharing at least one information processing apparatus.

11. The information processing apparatus according to claim 10, wherein the memory is configured to store ranges of hash value obtained by applying a hash function to names identifying the replications of the one or more identifiable data and identifiers of the information processing apparatuses which store the one or more identifiable data such that the ranges of hash value and the identifiers of the information processing apparatuses are associated with each other, and the processor is configured to generate the identifiers of information processing apparatuses included in the plurality of groups of information processing apparatuses in accordance with the correspondence relationships between the ranges of hash value and the identifiers of the information processing apparatuses which store the replications of the one or more identifiable data.

12. A non-transitory computer-readable storage medium storing a program that causes a computer to execute a process, the process comprising:

referring to information processing apparatuses in each of a plurality of groups and identifiers of the plurality of groups, the information processing apparatuses respectively storing replications of one or more identifiable data, the plurality of groups being generated by classifying a plurality of information processing apparatuses based on types of the replications stored in each of the plurality of information processing apparatuses; and detecting a failure of other information processing apparatus belonging to one or more groups among the plurality of groups to which the information processing apparatus executing the detecting of the failure belongs, based on the identifiers of information processing apparatuses and the identifiers of the plurality of groups.

13. The non-transitory computer-readable storage medium according to claim 12, wherein the plurality of groups are respectively defined by a union of sets of information processing apparatuses, the information processing apparatuses included in a set storing the replications of the one or more identifiable data, and the sets of the information processing apparatuses sharing at least one information processing apparatus.

14. The non-transitory computer-readable storage medium according to claim 13, wherein the computer is configured to store ranges of hash value obtained by applying a hash function to names identifying the replications of the one or more identifiable data and identifiers of the information processing apparatuses which store the one or more identifiable data such that the ranges of hash value and the identifiers of the information processing apparatuses are associated with each other; and wherein the process further comprises generating the identifiers of information processing apparatuses included in the plurality of groups of information processing apparatuses in accordance with the correspondence relationships between the ranges of hash value and the identifiers of the information processing apparatuses which store the replications of the one or more identifiable data.

* * * * *